(12) United States Patent
Martin et al.

(10) Patent No.: US 10,072,419 B2
(45) Date of Patent: *Sep. 11, 2018

(54) COATED SCRIM REINFORCED ROOFING MEMBRANE

(71) Applicant: Milliken & Company, Spartanburg, SC (US)

(72) Inventors: David W. Martin, Moore, SC (US); James D. Pinson, Laurens, SC (US)

(73) Assignee: Milliken & Company, Spartanburg, SC (US)

( * ) Notice: Subject to any disclaimer, the term of this patent is extended or adjusted under 35 U.S.C. 154(b) by 247 days.

This patent is subject to a terminal disclaimer.

(21) Appl. No.: 14/973,070

(22) Filed: Dec. 17, 2015

(65) Prior Publication Data

US 2016/0207278 A1    Jul. 21, 2016

Related U.S. Application Data

(60) Provisional application No. 62/105,912, filed on Jan. 21, 2015.

(51) Int. Cl.
*D06N 5/00* (2006.01)
*E04D 5/10* (2006.01)
(Continued)

(52) U.S. Cl.
CPC ............... *E04D 5/10* (2013.01); *B32B 5/024* (2013.01); *B32B 5/08* (2013.01); *B32B 27/12* (2013.01); *B32B 27/304* (2013.01); *C08L 27/06* (2013.01); *C09D 131/04* (2013.01); *D04B 21/16* (2013.01); *E04D 5/02* (2013.01); *E04D 5/06* (2013.01); *B32B 2037/243* (2013.01); *B32B 2250/40* (2013.01); *B32B 2255/02* (2013.01); *B32B 2255/26* (2013.01); *B32B 2260/021* (2013.01); *B32B 2260/046* (2013.01); *B32B 2262/0246* (2013.01); *B32B 2262/0253* (2013.01); *B32B 2262/0261* (2013.01);
(Continued)

(58) Field of Classification Search
CPC ....... B32B 5/028; B32B 27/304; B32B 27/12; B32B 2255/02; B32B 2255/26; B32B 2260/046; B32B 2419/06; C09D 129/14; E04D 5/10
See application file for complete search history.

(56) References Cited

U.S. PATENT DOCUMENTS 3,573,230 A  *  3/1971  Voorhees ............. C09D 127/12
                                                           252/514
4,762,744 A     8/1988  Woiceshyn et al. .......... 428/219
(Continued)

*Primary Examiner* — Jeremy R Pierce
(74) *Attorney, Agent, or Firm* — Cheryl J. Brickey

(57) ABSTRACT

A scrim reinforced roofing membrane comprising a coated scrim layer having a first side and a second side and a first polyvinyl chloride layer on the first side of the coated scrim layer. The coated scrim layer contains a scrim fabric which contains a plurality of warp yarns in a first direction and a plurality of weft yarns in a second direction approximately perpendicular to the first direction. The warp yarns cross the weft yarns at crossing points. The scrim fabric has a polyvinyl acetate coating which is located along the length of the warp yarns and the weft yarns and between the warp and weft yarns at the crossing points. The coated scrim is at least partially embedded in the first polyvinyl chloride layer.

6 Claims, 1 Drawing Sheet

(51) Int. Cl.
*B32B 27/30* (2006.01)
*B32B 27/12* (2006.01)
*E04D 5/02* (2006.01)
*E04D 5/06* (2006.01)
*C09D 131/04* (2006.01)
*C08L 27/06* (2006.01)
*B32B 5/02* (2006.01)
*B32B 5/08* (2006.01)
*D04B 21/16* (2006.01)
*B32B 37/24* (2006.01)

(52) U.S. Cl.
CPC ............... *B32B 2262/0269* (2013.01); *B32B 2262/0276* (2013.01); *B32B 2262/062* (2013.01); *B32B 2262/101* (2013.01); *B32B 2262/103* (2013.01); *B32B 2262/14* (2013.01); *B32B 2307/732* (2013.01); *B32B 2419/06* (2013.01); *C08L 2205/16* (2013.01); *D10B 2403/0122* (2013.01); *D10B 2505/18* (2013.01)

(56) References Cited

U.S. PATENT DOCUMENTS

| | | | |
|---|---|---|---|
| 5,822,943 A | 10/1998 | Frankoski et al. | 52/518 |
| 6,054,205 A | 4/2000 | Newman et al. | 428/221 |
| 6,652,951 B2 | 11/2003 | Gautreau | 428/105 |
| 8,590,267 B2 | 11/2013 | Jaffee | 52/746.11 |
| 8,669,196 B2 | 3/2014 | Mehta et al. | 442/402 |
| 8,791,193 B2 | 7/2014 | Wang et al. | 524/492 |
| 8,852,368 B2 | 10/2014 | Herbert et al. | 156/44 |
| 2003/0100233 A1* | 5/2003 | Fynan | D04H 3/12 442/58 |
| 2007/0281562 A1 | 12/2007 | Kohlman et al. | 442/32 |
| 2009/0126411 A1* | 5/2009 | Callaway | D04B 21/06 66/192 |

\* cited by examiner

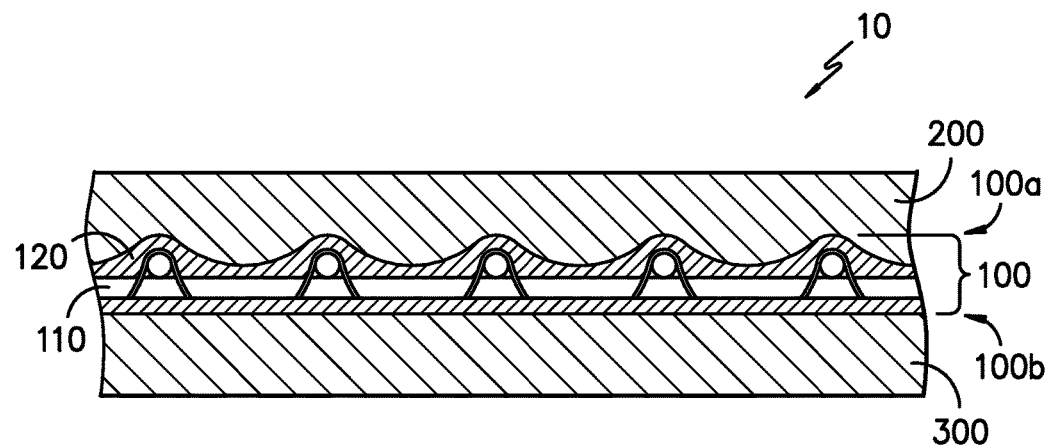
FIG. -1-
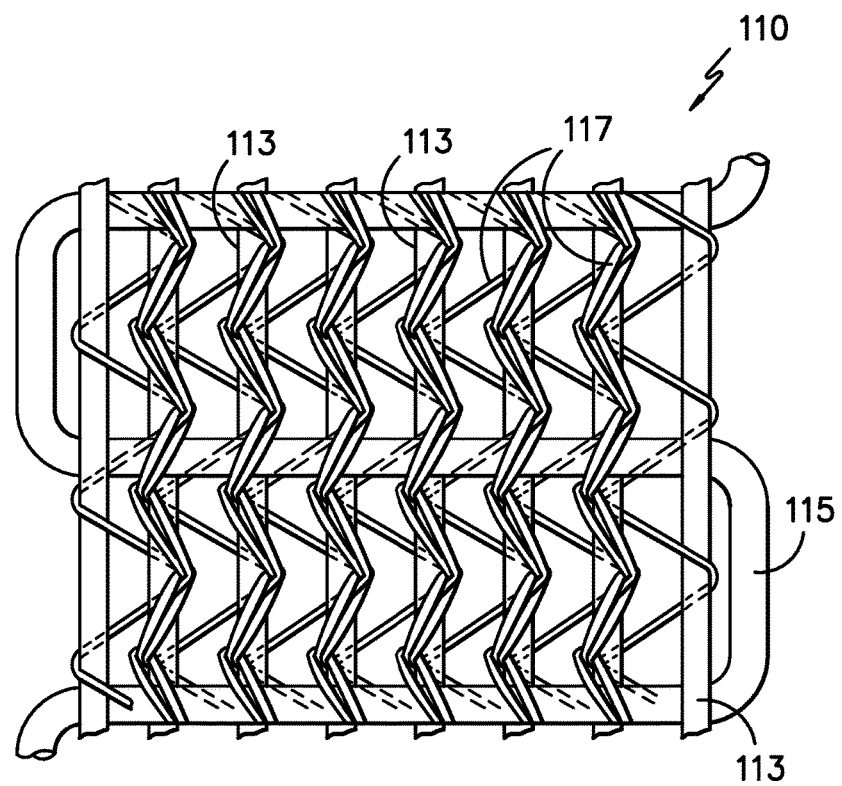
FIG. -2-

COATED SCRIM REINFORCED ROOFING MEMBRANE

RELATED APPLICATIONS

This application claims priority to provisional application 62/105,912, which is herein incorporated by reference in its entirety.

TECHNICAL FIELD

The present disclosure relates generally to roofing membranes containing a coated scrim.

BACKGROUND

Many membranes, such as membranes used as roofing, contain a fabric layer embedded into a polymer. There is a need for a membrane with enhanced tear resistance.

BRIEF SUMMARY

A scrim reinforced roofing membrane comprising a coated scrim layer having a first side and a second side and a first polyvinyl chloride layer on the first side of the coated scrim layer. The coated scrim layer contains a scrim fabric which contains a plurality of warp yarns in a first direction and a plurality of weft yarns in a second direction approximately perpendicular to the first direction. The warp yarns cross the weft yarns at crossing points. The scrim fabric has a polyvinyl acetate coating which is located along the length of the warp yarns and the weft yarns and between the warp and weft yarns at the crossing points. The coated scrim is at least partially embedded in the first polyvinyl chloride layer.

BRIEF DESCRIPTION OF THE DRAWING(S)

Exemplary embodiments will now be described by way of example, with reference to the accompanying drawings, wherein:

FIG. 1 is a cross-sectional illustration of one embodiment of the scrim reinforced roofing membrane.

FIG. 2 is an illustration of one embodiment of a scrim fabric.

DETAILED DESCRIPTION

FIG. 1 illustrates one embodiment of the scrim reinforced roofing membrane 10. The membrane 10 contains a coated scrim layer 100 having a first side 100a and a second side 100b. The coated scrim layer contains a scrim fabric 110 and a coating 120. The scrim fabric 110 comprises a plurality of warp yarns in a first direction and a plurality of weft yarns in a second direction approximately perpendicular to the first direction. The warp yarns cross the weft yarns at crossing points. The coating 120 comprises polyvinyl acetate and is located along the length of the warp yarns and the weft yarns and is located between the warp and weft yarns at the crossing points. The scrim reinforced roofing membrane 10 contains at least a first polyvinyl chloride layer 200 on the first side 100a of the coated scrim layer 100. The coated scrim 100 is at least partially embedded in the first polyvinyl chloride layer 200. FIG. 1 shows an optional second polyvinyl chloride layer 300 on the second side 100b of the coated scrim layer 100.

The scrim fabric 110 may be any suitable scrim layer including any suitable light-weight woven, knit, or nonwoven fabric. Preferably, the scrim layer is a weft inserted warp knit scrim, one example of which is shown in FIG. 2. The weft inserted warp knit scrim 110 contains a plurality of warp yarns 113, weft yarns 115, and stitching yarns 117. The stitching yarns may have any suitable stitching pattern, including tricot stitches (shown in FIG. 2) or pillar stitches, or other stitches. While the fabric in Figure has the weft is laid in every third course, or every third row of stitches, the weft may be inlaid in any desirable pattern, preferably every course. Additionally, the weft yarn in FIG. 2 is a continuous weft, in an alternatively preferred embodiment, the weft yarn is a laid in yarn from a warp bar with a long shog and the weft may be cut on both ends after it is laid in.

The scrim fabric 110 is preferably open meaning that there are large amounts of open space between the yarns within the scrim layer 110. This is preferred so that there can be good adhesion between all of the layers within the scrim reinforced roofing membrane 10. In one embodiment, the scrim layer contains between 6 and 18 warp yarns per inch, more preferably between 8 and 12 warp yarns per inch. In another embodiment, the scrim layer contains between 4 and 18 weft yarns per inch, more preferably between 7 and 12 weft yarns per inch.

The yarns used in the scrim fabric 110 may be any suitable yarn, including but not limited to a spun staple yarn, a multifilament yarn, and/or a monofilament yarn. "Yarn", in this application, as used herein includes a monofilament elongated body, a multifilament elongated body, ribbon, strip, fiber, tape, and the like. The term yarn includes a plurality of any one or combination of the above. Some suitable materials for the yarns include polyamide, aramids (including meta and para forms), rayon, PVA (polyvinyl alcohol), polyester, polyolefin, polyvinyl, nylon (including nylon 6, nylon 6, 6, and nylon 4,6), polyethylene naphthalate (PEN), cotton, steel, carbon, fiberglass, steel, polyacrylic or any other suitable artificial or natural fiber. In one embodiment, the yarns in the scrim layer 110 are preferably continuous multifilament polyester. Continuous multifilament polyester has been shown to have good adhesion and strength characteristics.

Within the coated scrim layer 100, the scrim fabric 110 is coated with a coating 120 comprising polyvinyl acetate (PVAC). The coating may also include other suitable additives such as adhesion promoters, anti-wicking chemistries, colorants, anti-microbial chemistries, abrasion resistance, UV stabilizers, and the like. Preferably, the coating 120 also contains a fluorochemical, preferably a fluorocarbon. The preferred ratio by weight of PVAC to fluorocarbon is in the range of between about 10:1 and 20:1, more preferably about 16:1. The preferred amount of total solids add-on is the range of between about 1 and 30% wt., more preferably between about 5 and 15% wt., more preferably between about 8 and 12% wt., more preferably approximately 10% wt. Chemistry application is by way of a submerged dip with heated can drying immediately after.

The coating is located along the length of the warp yarns and the weft yarns and is located between the warp and weft yarns at the crossing points. FIG. 1 is not drawn to scale, typically the coating 120 on the scrim fabric 110 is very thin and cannot be easily seen (the coating 120 in the Figure was enlarged so that it was more easily seen). Preferably, the coating 120 does not window the scrim fabric 110 meaning that it does not fill the open space within the scrim fabric 110 with a film of coating.

The scrim reinforced roofing membrane 10 contains at least a first polyvinyl chloride layer 200 on the first side 100a of the coated scrim layer 100. The coated scrim 100 is at least partially embedded in the first polyvinyl chloride layer 200. Preferably the coated scrim layer 100 is fully embedded and encapsulated by the PVC layer(s) 200, 300. FIG. 1 shows an optional second polyvinyl chloride (PVC) layer 300 on the second side 100b of the coated scrim layer 100. PVC layers have been found to produce roofing membranes with good properties and cost effectiveness. In one embodiment, the PVC layer(s) 200, 300 have a thickness of between about 10-40 mils, more preferably between about 15-40 mils, more preferably between about 1.2 and 2.2 mm. When both the first PVC layer 200 and the second PVC layer 300 are used in the membrane 10, preferably the two layers 200, 300 touch and adhere to each other through the open areas of the scrim fabric 110.

The PVC layer(s) 200, 300 may be applied to the coated scrim layer 100 in any suitable manner such as coating, extruding, and lamination. In one preferred embodiment, the PVC layer(s) 200, 300 is laminated onto the coated scrim layer 100. A PVC layer(s) 200, 300 are delivered to the coated scrim layer 100 as a free standing film that is then adhered to the coated scrim layer 100 using heat and/or pressure and/or adhesive. The PVC layer(s) 200, 300 may be applied to only one side of the coated scrim layer 100 or may be applied to both sides of the knit fabric sequentially or simultaneously.

In another preferred embodiment, the PVC layer(s) 200, 300 are extruded onto the coated scrim layer 100. The PVC layer(s) 200, 300 are delivered to the coated scrim layer 100 in a molten state on one or both sides of the coated scrim layer 100.

The membrane 10 may be subjected to additional processing steps such as coatings, surface treatments, adhering the membrane to additional components, and calendaring. Calendaring further compresses the coated scrim layer 100 and the PVC layer(s) 200, 300 to deliver a thinner membrane 10. Calendaring may be part of the process of coating the coated scrim layer 100 with the PVC layer(s) 200, 300 such as in the lamination process or a separate operation.

EXAMPLES

Example 1

A weft inserted warp knit scrim was formed using 1000 denier high tenacity, low shrink continuous multifilament polyester yarns as the warp, weft, and 70 denier polyester stitching yarns. The polyester yarns were anti-wicking yarns purchased from Performance Fibers and had been treated with a commercially available anti-wicking chemistry. The scrim fabric was formed having 9 warps per inch, 9 wefts per inch, and a stitching yarn having a tricot stitch.

The scrim fabric was placed between two PVC films, each having a thickness of 30 mils. The stacked films and scrim were then heated in a belt press laminator at 180° C. and 60 psi for 1 minute.

Example 2

A weft inserted warp knit scrim was formed using 1000 denier high tenacity, low shrink continuous multifilament polyester yarns as the warp, weft, and 70 denier polyester stitching yarns. The scrim fabric was formed having 9 warps per inch, 9 wefts per inch, and a stitching yarn having a tricot stitch. The scrim was then dip coated in an aqueous coating of PVAC available from Celanese and fluorocarbon avail-able as RPL-6 from Milliken Chemical. The coating was approximately 9% wt PVAC and 1% wt fluorocarbon and the add-on weight was 10%.

The scrim fabric was placed between two PVC films, each having a thickness of 30 mils. The stacked films and scrim were then heated in belt press laminator at 180° C. and 60 psi for 1 minute.

Results

The membranes from Examples 1 and 2 were tested using a modified version of ASTM D751 Tear Resistance tearing in the machine or warp direction of the scrim fabric. The tear resistance of Example 1 was 38.89 pounds and the tear resistance of Example 2 was 70.01 pounds. The tear resistance of Example 2 was 80% higher than Example 1 which would be very desirable in a roofing membrane.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:
1. A scrim reinforced roofing membrane comprising:
a coated scrim layer having a first side and a second side, wherein the coated scrim layer comprises:
a scrim fabric, wherein the scrim fabric is a weft insert warp knit fabric, wherein the scrim fabric comprises a plurality of warp yarns in a first direction and a plurality of weft yarns in a second direction approxi- mately perpendicular to the first direction, wherein the warp yarns cross the weft yarns at crossing points; and, a coating comprising polyvinyl acetate and a fluorocarbon, wherein the coating is located along the length of the warp yarns and the weft yarns and is located between the warp and weft yarns at the crossing points;

a first polyvinyl chloride layer on the first side of the coated scrim layer; and, a second polyvinyl chloride layer on the second side of the coated scrim layer, wherein the coated scrim is fully embedded and encapsulated in the first polyvinyl chloride layer and the second polyvinyl chloride layer.

2. The scrim reinforced roofing membrane of claim 1, wherein the warp yarns and weft yarns of the scrim fabric comprise polyester yarns.

3. The scrim reinforced member of claim 1, wherein the thickness of each polyvinyl chloride layer is between 10 and 40 mils.

4. The scrim reinforced roofing member of claim 1, wherein the coating has a weight of between about 1 and 30% of the scrim.

5. The scrim reinforced roofing member of claim 1, wherein the coating has a weight of between about 5 and 15% of the scrim.

6. The scrim reinforced roofing member of claim 1, wherein the ratio by weight of polyvinyl acetate to fluorocarbon is in the range of between about 10:1 and 20:1.

* * * * *